(12) United States Patent
Erickson et al.

(10) Patent No.: US 8,799,545 B2
(45) Date of Patent: Aug. 5, 2014

(54) RESTORING STABILITY TO AN UNSTABLE BUS

(75) Inventors: Mike Erickson, Fort Collins, CO (US); David Maciorowski, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/387,186

(22) PCT Filed: Feb. 26, 2010

(86) PCT No.: PCT/US2010/025602
§ 371 (c)(1),
(2), (4) Date: Jan. 26, 2012

(87) PCT Pub. No.: WO2011/106016
PCT Pub. Date: Sep. 1, 2011

(65) Prior Publication Data
US 2012/0331196 A1    Dec. 27, 2012

(51) Int. Cl.
| | |
|---|---|
| *G06F 13/00* | (2006.01) |
| *G06F 1/12* | (2006.01) |
| *G06F 13/42* | (2006.01) |
| *H04L 5/00* | (2006.01) |
| *H04L 7/00* | (2006.01) |
| *G06F 1/00* | (2006.01) |
| *G06F 1/04* | (2006.01) |
| *G06F 1/24* | (2006.01) |
| *G06F 11/00* | (2006.01) |
| *G06F 5/06* | (2006.01) |
| *G06F 11/07* | (2006.01) |

(52) U.S. Cl.
CPC ........ *G06F 13/4291* (2013.01); *G06F 11/0745* (2013.01); *G06F 11/0793* (2013.01)
USPC ........... 710/110; 713/400; 713/500; 713/503; 713/600; 714/34

(58) Field of Classification Search
USPC ...................... 713/400–601; 714/34; 710/110
See application file for complete search history.

(56) References Cited

U.S. PATENT DOCUMENTS

| | | | | |
|---|---|---|---|---|
| 5,341,480 | A | * | 8/1994 | Wasserman et al. .......... 710/107 |
| 5,560,002 | A | * | 9/1996 | Kardach et al. ............... 713/500 |
| 5,680,151 | A | * | 10/1997 | Grimm et al. ................. 345/419 |

(Continued)

FOREIGN PATENT DOCUMENTS

| | | | | |
|---|---|---|---|---|
| DE | 19961771 A1 | * | 9/2000 | .............. G06F 13/36 |
| EP | 1710709 | | 10/2006 | |

(Continued)

OTHER PUBLICATIONS

"NA910345: SCSI Synchronous Transfer Granularity", Mar. 1, 1991, IBM, IBM Technical Disclosure Bulletin, vol. 33, Iss. 10A, pp. 45-48.*

(Continued)

*Primary Examiner* — Faisal M Zaman

(57) ABSTRACT

A method for restoring stability to an unstable bus includes cycling a clock of the bus a number of times, transmitting a stop bit, cycling a clock line of the bus at least one time and transmitting a stop bit immediately after an acknowledgment bit has been received by a bus master.

11 Claims, 2 Drawing Sheets

(56) References Cited

U.S. PATENT DOCUMENTS

| | | | |
|---|---|---|---|
| 5,918,043 A * | 6/1999 | Kardach et al. | 713/601 |
| 6,014,752 A * | 1/2000 | Hao et al. | 713/500 |
| 6,192,426 B1 * | 2/2001 | Kando et al. | 710/52 |
| 6,334,181 B1 * | 12/2001 | Boutaud et al. | 712/38 |
| 6,581,124 B1 * | 6/2003 | Anand | 710/305 |
| 7,146,551 B2 * | 12/2006 | Ghisiawan et al. | 714/726 |
| 7,504,900 B2 * | 3/2009 | Alfano et al. | 331/173 |
| 8,489,786 B2 * | 7/2013 | Radhakrishnan et al. | 710/110 |
| 2002/0006134 A1 * | 1/2002 | San Juan | 370/462 |
| 2002/0062414 A1 * | 5/2002 | Hofmann et al. | 710/110 |
| 2002/0067638 A1 * | 6/2002 | Kobayashi et al. | 365/185.01 |
| 2002/0117044 A1 * | 8/2002 | Sakurada et al. | 84/600 |
| 2003/0135774 A1 * | 7/2003 | Voth et al. | 713/400 |
| 2004/0225813 A1 * | 11/2004 | Ervin | 710/305 |
| 2004/0230866 A1 * | 11/2004 | Yates et al. | 714/25 |
| 2008/0071879 A1 * | 3/2008 | Park | 709/208 |
| 2008/0195783 A1 * | 8/2008 | Deshpande | 710/110 |
| 2008/0209252 A1 * | 8/2008 | Saripalli et al. | 713/600 |
| 2009/0249122 A1 * | 10/2009 | Nadehara | 714/34 |
| 2009/0292840 A1 * | 11/2009 | Konnail et al. | 710/61 |
| 2011/0099310 A1 * | 4/2011 | Haban et al. | 710/110 |
| 2011/0202698 A1 * | 8/2011 | Lotzenburger et al. | 710/110 |
| 2012/0191889 A1 * | 7/2012 | Fischer et al. | 710/110 |

FOREIGN PATENT DOCUMENTS

| | | | | |
|---|---|---|---|---|
| GB | 2341469 A | * | 3/2000 | G06F 13/385 |
| JP | 08297607 A | * | 11/1996 | G06F 12/08 |
| JP | 2001290759 A | * | 10/2001 | G06F 13/36 |
| KR | 10-1999-0031462 | | 5/1999 | |
| KR | 10-2007-00053 86 | | 1/2007 | |
| WO | WO 0106378 A1 | * | 1/2001 | G06F 13/42 |
| WO | WO 2005106687 A1 | * | 11/2005 | G06F 13/40 |
| WO | WO 2011106016 A1 | * | 9/2011 | G06F 13/38 |

OTHER PUBLICATIONS

Zheng-wei Hu, "I2C Protocol Design for Reusability," Information Processing (ISIP), 2010 Third International Symposium on , pp. 83,86, Oct. 15-17, 2010.*

Corcoran, P., "Two Wires and 30 Years : A Tribute and Introductory Tutorial to the I2C Two-Wire Bus," Consumer Electronics Magazine, IEEE , vol.2, No. 3, pp. 30,36, Jul. 2013.*

Oberg, J.; Wei Hu; Irturk, A.; Tiwari, M.; Sherwood, T.; Kastner, R., "Information flow isolation in I2C and Usb," Design Automation Conference (DAC), 2011 48th ACM/EDAC/IEEE , pp. 254,259, Jun. 5-9, 2011.*

PCF8584 I2C—Bus Controller Data Sheet(1997) (Philips Semiconductors Co. Ltd) Dec. 31, 1997, pp. 5, 6 and figures 1.10-13.

The I2C—Bus Specification Version 2.1(2000) (Philips Semiconductors Co. Ltd) Dec. 31, 2000, pp. 4,6-10,13 and figures 4,5,6.10.

* cited by examiner

*Figure 2*
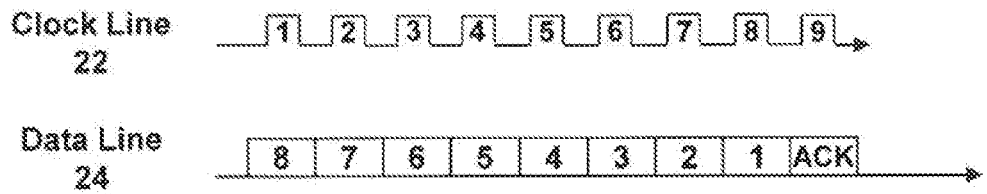
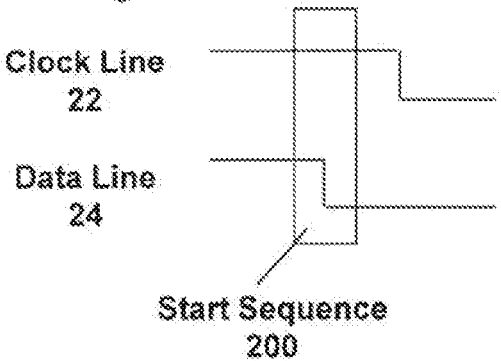
*Figure 3a*
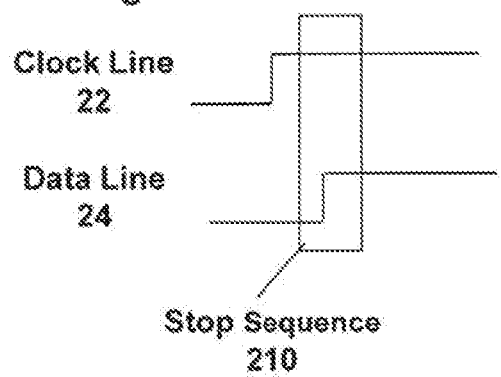
*Figure 3b*
*Figure 5*
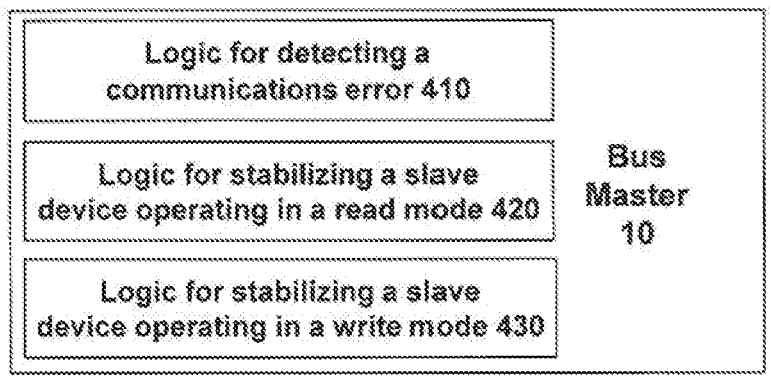

RESTORING STABILITY TO AN UNSTABLE BUS

BACKGROUND

When designing high-availability computing systems, a premium is placed on providing fault-recovery mechanisms that can quickly regain full system performance with minimal downtime. For cost reasons, additional hardware and software specifically needed to perform fault recovery tasks should be reduced to a bare minimum.

BRIEF DESCRIPTION OF THE DRAWINGS

FIG. 2 shows the relative timing between clock cycles and data words being transmitted by the bus according to an embodiment of the invention.

FIGS. 3a and 3b show the signal levels as a function of time on the clock and data lines during the start and stop sequence that initiate and terminate data transmission along the bus shown in FIG. 1.

FIG. 5 is a representation of a logic module used to restore stability to an unstable bus according to an embodiment of the invention.

DESCRIPTION OF THE EMBODIMENTS

A method and logic module for restoring stability to an unstable computer data bus can be used in many computing environments to quickly regain control of the data bus using a minimum of hardware and software resources. Embodiments of the invention may be especially useful in high-availability computing systems in which any downtime can significantly impact the processing functions of other computing resources that depend on the outputs of the high-availability computing system.

Figure 1:
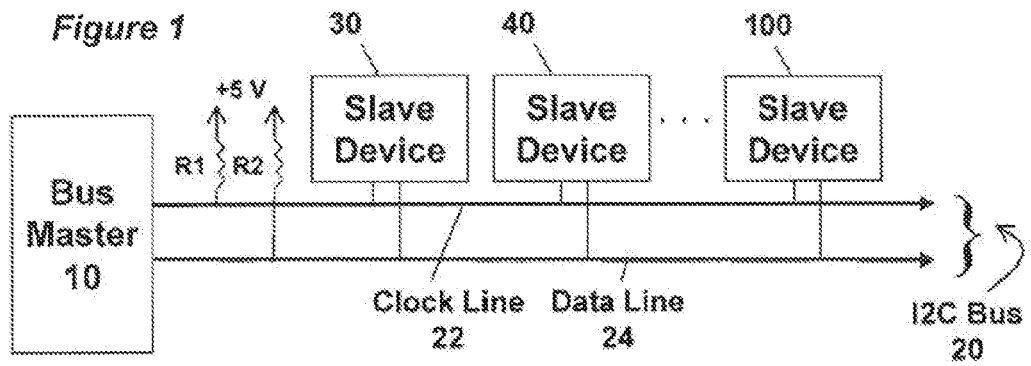
FIG. 1 is a system-level block diagram showing a bus master and various slave devices coupled by way of an intervening inter-integrated circuit (I2C) bus according to an embodiment of the invention.

FIG. 1 is a system-level block diagram showing a bus master and various slave devices coupled by way of an intervening inter-integrated circuit (I2C) bus (20) according to an embodiment of the invention. In FIG. 1, bus master 10 communicates with slave devices 30, 40, and 100 by way of bus 20. Although only three slave devices (30, 40, and 100) are shown the figure, embodiments of the invention may include as few as one slave device or may perhaps include 10 or more slave devices. Other embodiments of the invention may also include a multiplexer placed between inter-integrated circuit bus 20 and an additional set (consisting of perhaps 10 or more) slave devices that communicate with bus 20 through the multiplexer. This implies that bus master 10 may communicate with perhaps as many as 50 to 100 (or more) slave devices that are either directly interfaced to inter-integrated circuit bus 20 or indirectly interfaced to bus 20 by way of an intervening multiplexer.

The bus architecture of the example of FIG. 1 includes pull-up resistors R1 and R2, which are interfaced to a 3.3 Volt DC source. To bring about a clock cycle, the bus master momentarily provides a signal ground to clock line 22 of inter-integrated circuit bus 20. In accordance with an inter-integrated circuit bus specification, bus master 20 provides the signal ground to clock line 22 at a rate of 100 kHz or perhaps 400 kHz. To bring about data transmissions from bus master 10 to one or more of the slave devices interfaced to bus 20, the bus master provides a signal ground to data line 24. These modulations in the voltage present on bus 20 are sensed by each slave device and cause the slave devices to interpret the modulations as either a binary 1 or a binary 0.

FIG. 2 shows the relative timing between clock cycles and data words being transmitted by the bus according to an embodiment of the invention. In FIG. 2, it can be seen that eight data bits are present on data line 24 followed by an acknowledge (ACK) bit at period 9. It can also be seen that each data bit present on data line 24 occurs in lockstep with a clock cycle of clock line 22. In FIG. 2, data bits are placed on the data line starting with the most significant bit with the transmission of each eight-bit data word beginning while clock line 22 is pulled low.

FIGS. 3a and 3b show the signal levels as a function of time on the clock (22) and data (24) lines during the start and stop sequences (or bits) that initiate and terminate data transmission along bus 20 of FIG. 1. In contrast to the alignment of data and acknowledge bits 1-9 with the cycles of clock line 22 of FIG. 2, start sequence 200 and stop sequence 210 occur when data line 24 changes state while clock line 22 is pulled high. Thus, in FIG. 3a, while clock line 22 is high, transitioning data line 24 from a high state to a low state indicates start sequence 200. In FIG. 3b, stop sequence 210 is initiated when data line 24 is pulled from low to high while clock line 22 is in a high state. In embodiments of the invention described herein, these start and stop sequences (or Start and Stop bits) are initiated by bus master 10 of FIG. 1 when the bus master seeks to start or stop data transmission with each of the slave devices interfaced to inter-integrated circuit bus 20.

Returning now to FIG. 2, given the alignment between cycles of clock line 22 and the data bits placed on data line 24, it can be seen that a divergence in the timing between data line 24 and clock line 22 can cause the inter-integrated circuit bus (20) to become unsynchronized. Under these circumstances, bus master 10 can no longer communicate with any of slave devices 30, 40, and 100. In one example, bus master 10 may transmit an 8-bit word plus the acknowledge bit; however, due to the timing misalignment between clock line 22 and data line 24, the intended recipient (i.e. one of slave devices 30, 40, and 100) does not correctly identify the ninth bit as being an acknowledge bit. This, in turn, can cause bus master 10 to proceed to its next task under the erroneous assumption that the slave device has received the data word and is now operating according the data encoded in the received word.

Previous attempts to correct misalignments between clock line 22 and data line 24 have involved the use of a sideband reset pin on one or more of slave devices 30, 40, and 100 under the control of a discrete output from bus master 10. Unfortunately, for reasons of cost and complexity, many slave devices do not include such a reset pin, nor do many bus masters include a discrete output that might be used to drive the reset pin. Accordingly, the use of a sideband reset pin is generally not viewed as a viable option.

Another option previously attempted to correct misalignments between clock line 22 and data line 24 is to power cycle one or more of slave devices 30, 40, and 100. However, in high-availability systems, where any system downtime is of great concern, the notion of power cycling elements interfaced to inter-integrated circuit bus 20 to correct misalignments between the clock and data line is also not viewed as a viable option.

Figure 4:
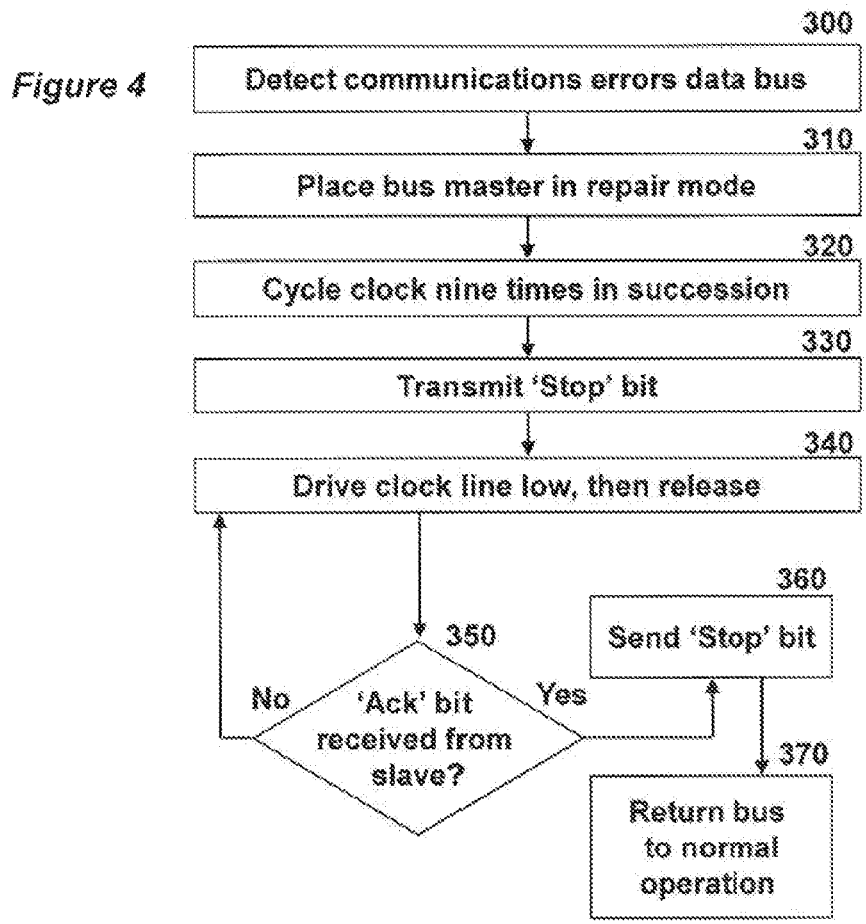
FIG. 4 is a flowchart for a method of restoring stability to an unstable bus according to an embodiment of the invention.

FIG. 4 is a flowchart for a method of restoring stability to an unstable bus according to an embodiment of the invention. The method of FIG. 4 may be performed by bus master 10 of FIGS. 1 and 5, although other combinations of hardware and software could be used to perform the method. The embodiment of FIG. 4 begins at step 300 in which a bus master detects communications errors on a data bus. These errors may be detected by analyzing the timing between clock and data lines or may be detected by analyzing the actual data words present on the data bus.

At step 310, a bus master is placed into a repair mode. In this step, the normal operations of the bus master are momentarily suspended so that the unstable bus can be restored to normal operation. At this point, it is unknown as to whether the data bus is operating in a "read" mode or a "write" mode. Accordingly, the bus master first proceeds under the assumption that the data bus is operating in a read mode in which data is being transmitted from a slave device to be read in by the bus master. In accordance with assuming that the bus is operating in a read mode, step 320 is performed in which the bus master cycles the clock line (such as clock line 22 of the FIG. 1) nine times in succession. As previously discussed herein, cycling the clock line nine times signals to the slave devices that a full byte of data is being transmitted along the data bus. This ensures that at some point during a byte transfer, the slave device in a read mode interprets an undriven data line as a "not acknowledged" signal, and the slave device then stops providing data and waits for a stop condition. The method then proceeds to step 330 in which a stop bit is transmitted by the bus master.

At this point, if indeed the one or more slave devices had been operating in a read mode, cycling the clock line 9 times followed by a stop bit should, at least in embodiments in which data bus 20 operates in compliance with an inter-integrated circuit bus, cause the slave device to cease transmitting data and return to an idle state.

After step 330 is performed, the method proceeds to step 340 under the assumption that the instability to the data bus occurred while the data bus was operating in a write mode in which data was being transferred from the bus master to one or more slave devices. To restore stability to the bus, step 340 is performed in which the clock line is momentarily driven low, then released. At step 350, the bus master waits to determine if an acknowledge bit has been received from the slave. If, at step 350, an acknowledge bit has not been received, the method returns to step 340 in which the clock line is driven low a second time then released.

Step 340 and step 350 are performed up to nine times so long as an acknowledge bit has not been received from one or more slave devices transmitting on the data bus. When an acknowledge bit is received, step 360 is performed in which the bus master immediately transmits a stop bit to the one or more slave devices. At this point, step 370 is performed in which bus operation is returned to normal.

Some embodiments of the invention may not require all of the steps identified in FIG. 4. For example, in some embodiments, a method for restoring stability to an unstable bus may include the steps of cycling a clock line of the bus a number of times (step 320), transmitting a stop bit (step 330), cycling a clock line of the bus at least one time (step 340), and transmitting a stop bit immediately after an acknowledgment bit has been received by a bus master (step 350).

FIG. 5 is a logic module for restoring stability to an unstable bus according to an embodiment of the invention. The logic module of FIG. 5 is shown as being perhaps integral to bus master 10, but may also be implemented by way of a field programmable gate array (FPGA), state machine, or other device that is separate and distinct from bus master 10. The logic module of FIG. 5 includes logic for detecting a communications error (410), logic for stabilizing a slave device operating in a read mode (420), and logic for stabilizing a slave device operating in a write mode (430).

In an embodiment of the invention, logic for detecting that a communications error has occurred on the bus includes the use of an inter-integrated circuit bus. The logic for stabilizing a slave device operating in a read mode (420) includes logic for transmitting nine clock cycles followed by a stop bit. The logic module for stabilizing a slave device operating in a write mode (430) includes logic for momentarily driving a clock line low, then releasing the clock line until an acknowledge bit has been received. If an acknowledgment bit has not been received, the clock line is driven low and released in a repetitive manner until an acknowledge bit has been received from the one or more slave devices. At such time that an acknowledge bit has been received from the one or more slave devices, the data bus is returned to its normal operating state.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method for restoring stability to an unstable inter-integrated circuit (I2C) bus, comprising:
   detecting that a communication error has occurred on the inter-integrated circuit (I2C) bus without knowledge as to whether communication between a bus master and a slave device across the bus is in a read mode or a write mode;
   placing the bus master in a repair mode in response to the detecting of the communication error, while in the repair mode:
   stabilizing the slave device should the slave device be operating in a read mode by:
      cycling a clock line of the inter-integrated circuit (I2C) bus a number of times; and
      transmitting a stop bit;
   stabilizing the slave device should the slave device be operating in a write mode by:
      cycling a clock line of the bus at least one time and up to the number of times until an acknowledgment bit has been received by the bus master; and
      transmitting a stop bit immediately after the acknowledgment bit has been received by the bus master; and
   returning the bus to a normal operating state after transmission of the stop bit immediately after the acknowledgment has been received by the bus master.

2. The method of claim 1, wherein the dock line is cycled the number of times in succession without pausing to determine when one or more data bits has been received from the slave device interfaced to the bus.

3. The method of claim 1, wherein the number of times is nine times.

4. The method of claim 1, wherein the acknowledgement bit is received from the slave device that transmits to the bus master.

5. The method of claim 1, wherein the cycling a clock line of the bus is repeated at least a second time in the event that the acknowledgment has not yet been received by the bus master.

6. The method of claim 5, wherein cycling a clock line of a bus is repeated up to a maximum of nine times in the event that the acknowledgment has not been received by the bus master.

7. The method of claim 1, wherein the number of times corresponds to a number of bits in a data word plus an acknowledgment bit.

8. A method for restoring stability to an unstable inter-integrated circuit (I2C) bus, comprising:
   detecting that a communication error has occurred on the I2C bus without knowledge as to whether communication between a bus master and a slave device across the bus is in a read mode or a write mode;
   placing the bus master in a repair mode in response to the detecting of the communication error, while in the repair mode:
      stabilizing the slave device should the slave device be operating in a read mode by:
         cycling a clock line of the I2C b s a number of times; and
         transmitting a stop bit;
      stabilizing the slave device should the slave device be operating in a write mode by:
         cycling a clock line of the bus at least one time and up to the number of times until an acknowledgment bit has been received by the bus master; and
         transmitting a stop bit immediately after the acknowledgment bit has been received by the bus master, wherein the cycling a clock line of a bus is repeated at least a second time in the event that the acknowledgment has not yet been received by the bus master and wherein cycling a clock line of a bus is repeated up to a maximum of nine times in the event that the acknowledgment has not been received by the bus master; and
      returning the bus to a normal n state after transmission of the stop bit immediately after the acknowledgment has been received by the bus master.

9. The method of claim 8, wherein the acknowledgment bit is received from the slave device that transmits to the bus master.

10. A method for restoring stability to an unstable inter-integrated circuit (I2C) bus, comprising:
   detecting that a communication error has occurred on the inter-integrated circuit (I2C) bus without knowledge as to whether communication between a bus master and a slave device across the bus is in a read mode or a write mode;
   placing the bus master in a repair mode in response to the detecting of the communication error, while in the repair mode:
      stabilizing the slave device should the slave device be operating in a read mode by:
         cycling a dock line of the inter-integrated circuit (I2C) bus a number of times, the number of times being based upon a number of bits in a data word plus an acknowledgment bit; and
         transmitting a stop bit;
      stabilizing the slave device should the slave device be operating in a write mode by:
         cycling a dock line of the bus at least one time and up to the number of times until an acknowledgment bit has been received by the bus master; and
         transmitting a stop bit immediately after the acknowledgment bit has been received by the bus master; and
      returning the bus to a normal operating state after transmission of the stop bit immediately after the acknowledgment has been received by the bus master.

11. The method of claim 10, wherein the number of times corresponds to a number of bits in a data word plus an acknowledgment bit.

* * * * *

UNITED STATES PATENT AND TRADEMARK OFFICE
CERTIFICATE OF CORRECTION

PATENT NO.        : 8,799,545 B2
APPLICATION NO.   : 13/387186
DATED             : August 5, 2014
INVENTOR(S)       : Mike Erickson et al.

It is certified that error appears in the above-identified patent and that said Letters Patent is hereby corrected as shown below:

In the Claims

Column 4, line 62, Claim 2, delete "dock" and insert -- clock --, therefor.

Column 5, line 24, Claim 8, delete "b s" and insert -- bus --, therefor.

Column 6, line 1, Claim 8, delete "n" and insert -- operating --, therefor.

Column 6, line 20, Claim 10, delete "dock" and insert -- clock --, therefor.

Column 6, line 27, Claim 10, delete "dock" and insert -- clock --, therefor.

Signed and Sealed this
Third Day of March, 2015

Michelle K. Lee
*Deputy Director of the United States Patent and Trademark Office*